(No Model.)
E. FIRTH & A. & I. TOMPKINS.
METHOD OF MAKING AXLE NUTS.
No. 396,865. Patented Jan. 29, 1889.
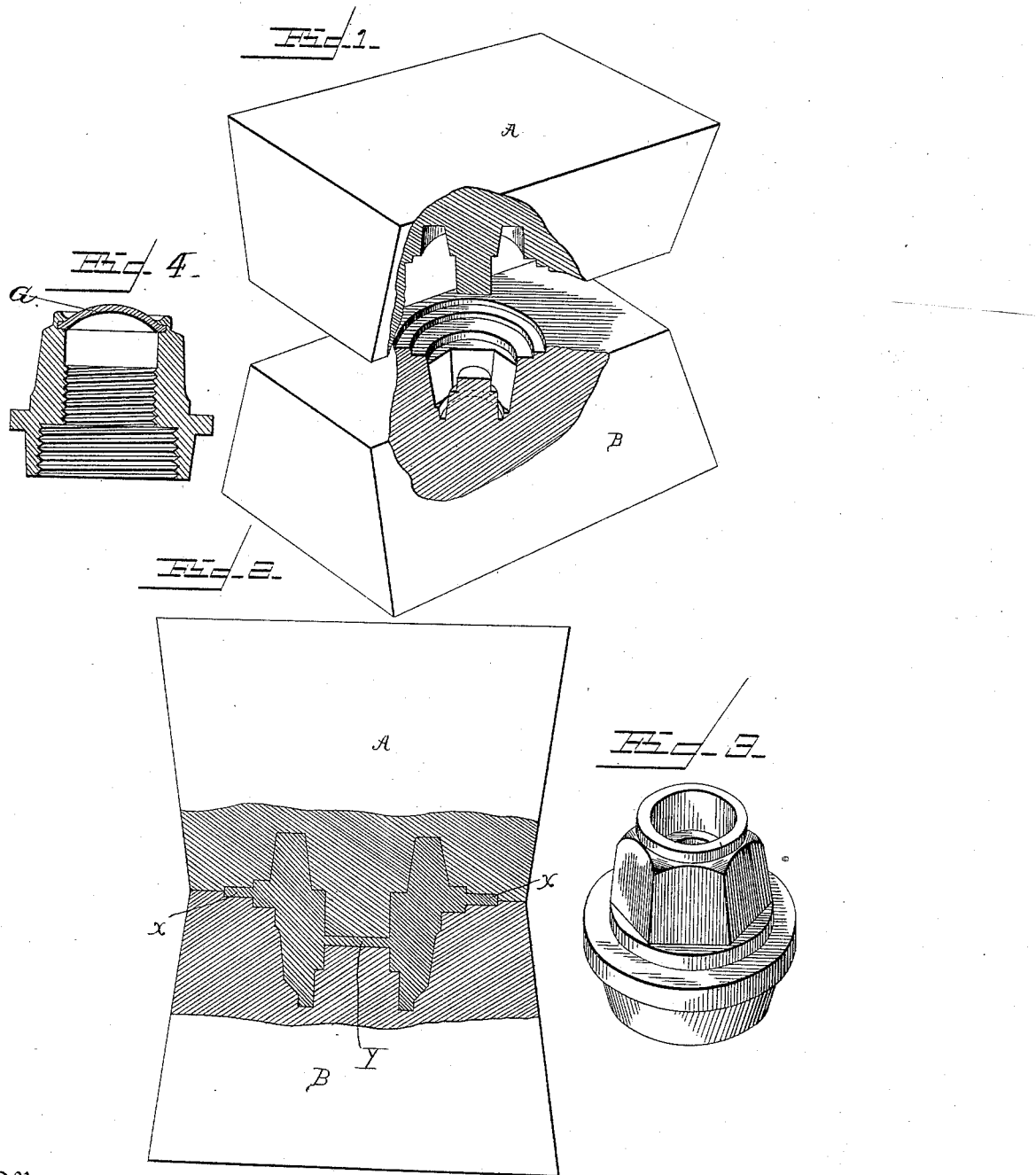
Witnesses,
Henry G. Dieterich
Inventors,
Edwin Firth,
Albert Tompkins,
Ira Tompkins,
By their Attorneys

UNITED STATES PATENT OFFICE.

EDWIN FIRTH, ALBERT TOMPKINS, AND IRA TOMPKINS, OF TROY, NEW YORK.

METHOD OF MAKING AXLE-NUTS.

SPECIFICATION forming part of Letters Patent No. 396,865, dated January 29, 1889.

Application filed February 23, 1888. Serial No. 264,884. (No model.)

*To all whom it may concern:*

Be it known that we, EDWIN FIRTH, ALBERT TOMPKINS, and IRA TOMPKINS, citizens of the United States, residing at Troy, in the county of Rensselaer and State of New York, have invented a new and useful Improvement in Methods of Making Axle-Nuts, of which the following is a specification.

Our invention relates to an improvement in methods of making axle-nuts; and it consists in forging the nut from steel or iron, then counterboring the nut to form the oil-chamber, then capping the outer end of the nut to complete the oil-chamber, and finally cutting screw-threads on the inner side of the nut, whereby an axle-nut will be produced which is as hard as the steel of which vehicle-axles are composed, has perfect screw-threads on its inner surface, and is very much more durable than the axle-nuts heretofore manufactured, as will be more fully set forth hereinafter, and particularly pointed out in the claims.

In the drawings, Figure 1 is a perspective view, partly in section, of a pair of dies adapted to forge an axle-nut by our improved method. Fig. 2 is a sectional view of the same, showing the dies closed together in the act of forging the nut. Fig. 3 is a perspective view of our improved form of axle-nut after the same has been forged by the dies. Fig. 4 is a longitudinal sectional view of the same after it has been counterbored to form the oil-chamber and threaded internally.

Axle-nuts have heretofore been made of cast-iron, brass, and other cast materials which are not as hard or durable as the spindles of steel axles, and are consequently objectionable for the reason that the threads cut from the said nuts to fit the threads on the axles become worn after awhile and permit the nuts to work loose and drop from the axles and allow the wheels to come off. A further objection to nuts made of malleable cast-iron is that the screw-threads formed therein cannot be made entire.

The object of our invention is to provide a method by means of which axle-nuts may be forged from steel or iron as hard as the material of which axles are composed, so that the threads in the nut will not become worn by screwing and unscrewing the same on the axle.

Our said method of making such an axle-nut is as follows: A pair of blocks, A B, have dies formed in them adapted to form a nut of the requisite size and shape. The lower die is placed on the bed of a drop-hammer. The upper die is secured to the hammer-head in the usual manner and arranged to register with the lower die. Into the latter is placed a piece of steel or iron of such size as will suffice to complete the nut and leave a surplus. This piece of steel or iron is first heated until it becomes plastic, and when it is placed in the lower die the hammer is operated and caused to descend, so that the upper die shall drop onto the lower die and thereby forge the nut, as shown in Fig. 2, any requisite number of strokes being given to the hammer to accomplish this result. The surplus steel or iron forms a "fin," X, between the faces of the die, and is afterward cut off from the nut by a suitable machine. The two dies do not quite meet at the center, and hence form a web, Y, across the bore of the nut, which web is subsequently punched out.

The act of forging the steel forces the dross and other impurities therefrom and compresses the molecular particles thereof, and thereby toughens the nut, as will be readily understood. After removing the nut from the dies the same is finished and has screw-threads cut in its bore or inner surface and is fitted for the market.

When it is desired to form an oil-chamber in the nut, the form shown in Fig. 3 is counterbored in the usual manner by placing it on a lathe.

In Fig. 4 we show the completed nut. After counterboring the nut so as to remove the pin Y, the outer end of the nut is closed by a cap, G, which is held in place by spinning down the rim of the nut.

Any desired shape or configuration may be imparted to the nut, and the same may be made of any required size.

No claim is made in this application to the nut or to the blocks or dies for forming the same, as the same constitute the basis for an application for Letters Patent of the United States, Serial No. 255,129, filed by us November 14, 1887.

Having thus described our invention, we claim—

1. The method of making an axle-nut, consisting in forging the same from steel or iron, then counterboring the nut to form the oil-chamber, and finally cutting screw-threads on the inner side of the nut, as set forth.

2. The method of making an axle-nut, consisting in forging the same from steel or iron, then counterboring the nut to form the oil-chamber, and then capping the outer end of the nut to complete the oil-chamber, as set forth.

In testimony that we claim the foregoing as our own we have hereto affixed our signatures in presence of two witnesses.

EDWIN FIRTH.
ALBERT TOMPKINS.
IRA TOMPKINS.

Witnesses:
WILLIAM ISENBERGH,
HARRY J. TOMPKINS.